United States Patent [19]

Kimura et al.

[11] Patent Number: 5,614,255
[45] Date of Patent: Mar. 25, 1997

[54] METHOD FOR THE PREPARATION OF VITREOUS HOLLOW MICROSPHERES

[75] Inventors: Kunio Kimura; Hiroyuki Nakamura, both of Tosu; Yukiyoshi Tamoto, Ichihara; Junichi Kimoto; Hiromi Okada, both of Mine, all of Japan

[73] Assignee: Japan as represented by Director General of Agency of Industrial Science and Technology, Japan

[21] Appl. No.: 678,062

[22] Filed: Jul. 9, 1996

[51] Int. Cl.$^6$ .................................................. B05D 7/00
[52] U.S. Cl. ................... 427/212; 427/215; 427/372.2; 501/80; 501/84; 501/85; 106/605; 65/21.4; 65/31
[58] Field of Search .................... 427/212, 215, 427/372.2; 501/85, 80, 84; 65/21.4, 31; 106/605

[56] References Cited

U.S. PATENT DOCUMENTS 3,904,377  9/1975  Honda et al. .................. 428/539.5
5,017,523  5/1991  Kimura et al. .................. 501/85

Primary Examiner—Benjamin Utech
Assistant Examiner—David M. Maiorana
Attorney, Agent, or Firm—Wenderoth, Lind & Ponack

[57] ABSTRACT

Proposed is an efficient method for the preparation of vitreous hollow microspheres from particles of a vitreous volcanic deposit by a heat treatment to effect expansion of the particles by foaming. The inventive method comprises a step, prior to the heat treatment for expansion of the particles, in which the starting particles are dispersed in an aqueous medium containing aluminum sulfate and urea each in a specified concentration followed by a heating treatment of the dispersion so as to deposit a coating layer of aluminum hydroxide on the particle surface so that the efficiency of foaming can be greatly improved without the disadvantage of particle agglomeration.

11 Claims, No Drawings

METHOD FOR THE PREPARATION OF VITREOUS HOLLOW MICROSPHERES

BACKGROUND OF THE INVENTION

The present invention relates to a method for the preparation of vitreous hollow microspheres from a vitreous volcanic deposit as the starting material. More particularly, the invention relates to an efficient method for the preparation of vitreous hollow microspheres having high mechanical strengths and excellent whiteness from a naturally occurring volcanic deposit.

Vitreous hollow microspheres as an industrial material are widely employed and the consumption thereof is rapidly increasing in recent years as a light-weight filler in various kinds of metallic materials, ceramics, concretes, plastics and the like by virtue of their very low particle density and excellent heat resistance.

Japanese Patent Publication 48-17645 discloses a method for the preparation of vitreous hollow microspheres from a vitreous volcanic deposit as the starting material, in which a vitreous volcanic sandy deposit called "shirasu" occurring in southern Kyushu Island of Japan is subjected to calcination at a temperature of 800° to 1200° C. for a length of time of 10 seconds to 10 minutes followed by elutriation in water or by air classification of particles to obtain vitreous hollow microspheres. This method, however, is not applicable to the processing of vitreous volcanic deposits having a particle diameter not exceeding 20 μm as a starting material of vitreous hollow microspheres as desired.

On the other hand, Japanese Patent Publication 2-296750 discloses a method for the preparation of ultrafine vitreous hollow microspheres in which a hydrothermal heating treatment of the starting material is undertaken by the use of an acid solution. This method, however, is defective because the hydrothermal treatment proceeding at a temperature higher than 100° C. must be undertaken in an acid-resistant and pressure-resistant reaction vessel necessarily accompanied by an economical problem due to the high investment for the facilities if not to mention the very low efficiency of the treatment.

SUMMARY OF THE INVENTION

In view of the above described situations, the present invention accordingly has an object to provide an efficient method for the preparation of vitreous hollow microspheres having a high mechanical strength and excellent whiteness from a vitreous volcanic deposit as the starting material without the troubles due to agglomeration of the particles in the course of foaming by heating and without the economical disadvantages.

Thus, the method of the present invention for the preparation of vitreous hollow microspheres comprises the steps of:

(a) dispersing particles of a vitreous volcanic deposit in an aqueous solution containing aluminum sulfate and urea in amounts in the range from 1 to 10% by weight and in the range from 50 to 300% by weight, respectively, based on the amount of the particles in concentrations of at least 1 mmole/liter and not exceeding 10 moles/liter, respectively;

(b) subjecting the aqueous dispersion of the particles to a heat treatment at a temperature in the range from 50° to 100° C.;

(c) taking the particles out of the aqueous medium of the dispersion;

(d) washing the particles with water;

(e) drying the thus washed particles;

(f) subjecting the thus dried particles to a heat treatment at a temperature in the range from 900° to 1100° C. for a length of time in the range from 1 second to 60 seconds to effect expansion of the particles; and, according to need, (g) subjecting the thus expanded particles to elutriation in water.

It is optional that the aqueous dispersion of the particles to be subjected to the heat treatment in step (b) does not contain urea which is added to the aqueous dispersion only after completion of the heat treatment.

DETAILED DESCRIPTION OF THE PREFERRED EMBODIMENTS

As is described above, the starting material used in the inventive method is a vitreous volcanic deposit including various kinds of natural minerals such as "shirasu", obsidian, pearlite, pitchstone and the like. They usually have a chemical composition comprising $SiO_2$, $Al_2O_3$, $Fe_2O_3$, CaO, MgO, $Na_2O$ and $K_2O$ and contain from 3 to 10% by weight of water.

The starting material used in the inventive method is a fine powder of such a vitreous volcanic deposit having a particle diameter preferably not exceeding 20 μm. Such a fine powder can be obtained by the pulverization of the deposit material followed by particle size classification by the method of air flotation or water elutriation to remove coarse particles.

In step (a) of the inventive method, the starting powder material mentioned above is dispersed in an aqueous solution containing aluminum sulfate and urea in amounts in the ranges from 1 to 10% by weight and from 50 to 300% by weight, respectively, or, preferably, from 2 to 8% by weight and from 80 to 200% by weight, respectively, based on the amount of the particles to give an aqueous dispersion. When the contents of these solutes in the aqueous dispersion are too low, the desired advantages to be obtained cannot be fully obtained while no additional advantages can be expected by increasing the contents of the solutes to exceed the above mentioned respective upper limits rather with an economical disadvantage. The concentration of aluminum sulfate in the aqueous solution should be at least 0.001 mole/liter or, preferably, in the range from 0.003 to 0.1 mole/liter and the concentration of urea should not exceed 10 moles/liter or, preferably, should be in the range from 0.5 to 5 moles/liter.

In step (b) of the inventive method, the aqueous dispersion of the particles of the starting material is subjected to a heat treatment. This heat treatment can be performed in one step in an aqueous medium containing both of aluminum sulfate and urea or, alternatively, can be performed stepwise first in an aqueous medium containing aluminum sulfate alone followed by the addition of urea to the aqueous dispersion which is further heated. Completion of the heat treatment is indicated by the pH value of the aqueous medium, which is about 3 before the heating treatment, and, when neutrality is obtained in the aqueous medium, the heat treatment can be terminated. The temperature of the heat treatment is usually in the range from 50° to 100° C. and the heating treatment is performed usually for at least 5 minutes. Increase in the temperature of the heat treatment has an effect to decrease the length of time required for the completion of the heat treatment. This heat treatment of the particles has an effect to envelop the surface of the particles with a layer of aluminum hydroxide by which the water contained in the particle is kept confined.

In the next place, the solid matter is taken out of the aqueous dispersion by a suitable solid-liquid separating means such as filtration followed by thorough rinse with water and drying. The thus dried particles are subjected to a heat treatment at a temperature in the range from 900° to 1100° C. for a length of time in the range from 1 to 60 seconds to effect expansion of the particles by foaming. This heat treatment has an effect to convert the coating layer of aluminum hydroxide on the surface of the particle into alumina so that the trouble due to agglomeration of the particles by melt bonding can be effectively prevented.

When the temperature of the heat treatment is too low, the expansion of the particles by foaming is sometimes incomplete while, when the temperature is too high, agglomeration of the particles by melt bonding may eventually be caused. When the length of time of the heat treatment is too short, the expansion of the particles by foaming cannot be complete while no further expansion of the particles proceeds by extending the time to exceed the above mentioned upper limit rather with a disadvantage due to agglomeration of the particles.

The particles thus expanded by foaming are then subjected, according to need, to classification relative to the particle density of the particles by the method of so-called sink-and-float separation in water or air-float separation to recover vitreous hollow microspheres having a particle diameter not exceeding 20 μm and a particle density, for example, not exceeding 1 g/cm$^3$ in a yield of 50% or higher based on the amount of the starting material as well as excellent whiteness of the powder and high mechanical strengths of the particles.

In the following, the method of the present invention is described in more detail by way of examples, which, however, never limit the scope of the invention in any way. The vitreous hollow microspheres prepared in the following examples were subjected to the evaluation tests for the whiteness of the powder and the mechanical strength of the particles by the testing procedures described below.

Whiteness:

The color difference between the powder and the standard white board was measured in the vicinity of the apex of the color system by the Lab method and the whiteness W was obtained from the following equation:

$$W = 100 - \sqrt{(100 - L)^2 + a^2 + b^2},$$

in which L is the brightness of the color, a gives the degree of redness, when positive, and greenness, when negative, and b gives the degree of yellowness, when positive, and blueness, when negative.

Strength:

A weighed amount of the sample powder contained in a sample holder made of a mesh screen was sealed in a pressurizable vessel, in which the sample powder was pressurized up to a pressure of 8 MPa for 1 minute and then taken out. The sample powder is then subjected to the particle classification by the sink-and-float method to be separated into lighter and heavier fractions, of which the lighter fraction was collected by filtration under suction in a glass filter and dried to determine the weight. The strength of the particles was assumed to be represented by the proportion of the floating fraction H in static water given by the following equation:

$$H = (m_1 - m_0)/S \times 100,$$

in which $m_1$ is the total weight of the glass filter and the powder fraction floating on the water surface, $m_0$ is the weight of the empty glass filter and S is the weight of the sample powder taken.

EXAMPLE 1

The starting material used in this example was so-called Fukushima clay occurring in Fukushima Prefecture, Japan, and the chemical composition of this clay was as follows: $SiO_2$ 74.84%; $TiO_2$ 0.07%; $Al_2O_3$ 10.74%; $Fe_2O_3$ 1.55%; MgO 0.21%; CaO 0.94%; $Na_2O$ 3.18%; $K_2O$ 2.99%; and ignition loss 5.74% (total 100.26%).

The starting clay was subjected to particle size classification with the lower and upper critical particle diameters of 5 μm and 10 μm for the sizes of separation by the method of elutriation utilizing the settling velocity of the particles in a liquid medium which was a 0.2% by weight aqueous solution of water glass (JIS No. 3). The powder fractions after this particle size classification always contained 10% by weight or less of coarse particles having a particle size exceeding 10 μm and 10% by weight or less of fine particles having a particle diameter smaller than 5 μm.

In the next place, 4 parts by weight of the particles after the above described particle size classification were added to 100 parts by weight of an aqueous solution of aluminum sulfate in a concentration of 0.005 mole/liter to be dispersed therein and the dispersion was heated at 90° C. for 12 minutes followed by the addition of urea thereto under continued agitation at 90° C. to give a concentration of urea of 1 mole/liter. Thereafter, the aqueous dispersion was kept at 90° C. and agitated further until the value of pH was gradually increased to exceed 6 followed by cooling and the particles in the dispersion were collected by filtration and thoroughly rinsed with water followed by drying.

The thus dried particles having a particle density of 2.36 g/cm$^3$ were supplied to a furnace, of which the temperature at the center of the heating zone was controlled at 1000° C., to effect expansion of the particles by foaming. The particles obtained by expansion, which had an average particle density of 1.03 g/cm$^3$, were subjected to the sink-and-float separation in water and the lighter fraction floating on the water was recovered as the vitreous hollow microspheres. The yield of the vitreous hollow microspheres was 48.9% of the starting material.

COMPARATIVE EXAMPLE

The clay particles after the particle size classification having a particle density of 2.36 g/cm$^3$ were subjected as such to the expansion treatment by heating in the same manner as in Example 1 without the heating treatment of the particles in an aqueous solution of aluminum sulfate and urea. The average particle density of the particles after the expansion treatment was 1.36 g/cm$^3$ and the yield of the vitreous hollow microspheres floating on water was only 24.4%.

EXAMPLE 2

An aqueous dispersion of 20 parts by weight of the same clay particles after the particle size classification as in Example 1 in 100 parts by weight of an aqueous solution of aluminum sulfate in a concentration of 0.025 mole/liter was heated at 90° C. for 15 minutes and then admixed with urea to give a concentration of 4 moles/liter. The dispersion was kept at 90° C. under agitation so that the pH of the aqueous medium was gradually increased to reach 6 when agitation of the dispersion was terminated followed by cooling. The particles were collected by filtration and thoroughly rinsed with water followed by drying.

The thus dried particles were supplied to a furnace for heating and expansion, of which the center portion of the heating zone was kept at a temperature of 1040° C., to effect expansion of the particles by heating. The staying time of the particles in the heating zone of the furnace was about 3 seconds. The particles obtained by expansion, which had an average particle density of 0.86 g/cm$^3$, were subjected to the sink-and-float separation in water and the lighter fraction floating on water was recovered as the vitreous hollow microspheres. The yield of the thus fractionated vitreous hollow microspheres was 51.6% of the starting material.

The thus prepared vitreous hollow microspheres had a whiteness W of 88.7 and strength H of 98.2.

What is claimed is:

1. A method for the preparation of vitreous hollow microspheres which comprises the steps of:
   (a) dispersing particles of a vitreous volcanic deposit in an aqueous solution containing aluminum sulfate and urea in amounts in the range from 1 to 10% by weight and in the range from 50 to 300% by weight, respectively, based on the amount of the particles;
   (b) subjecting the aqueous dispersion of the particles to a heat treatment at a temperature in the range from 50° to 100° C. for a length of time of at least 5 minutes;
   (c) taking the particles out of the aqueous medium of the dispersion;
   (d) washing the particles with water;
   (e) drying the thus washed particles; and
   (f) subjecting the thus dried particles to a heat treatment at a temperature in the range from 900° to 1100° C. for a length of time in the range from 1 second to 60 seconds to effect expansion of the particles.

2. The method for the preparation of vitreous hollow microspheres as claimed in claim 1 in which the concentration of aluminum sulfate in the aqueous solution is at least 0.001 mole/liter.

3. The method for the preparation of vitreous hollow microspheres as claimed in claim 1 in which the concentration of urea in the aqueous solution does not exceed 10 moles/liter.

4. The method for the preparation of vitreous hollow microspheres as claimed in claim 1 in which the heat treatment of the particles in an aqueous solution containing aluminum sulfate and urea is preceded by a heat treatment of the particles in an aqueous solution containing aluminum sulfate alone.

5. The method for the preparation of vitreous hollow microspheres as claimed in claim 1 in which the particles of a vitreous volcanic deposit have a particle diameter not exceeding 20 μm.

6. The method for the preparation of vitreous hollow microspheres as claimed in claim 1 in which the amount of aluminum sulfate in the aqueous solution is in the range from 2 to 8% by weight based on the amount of the particles.

7. The method for the preparation of vitreous hollow microspheres as claimed in claim 1 in which the amount of urea in the aqueous solution is in the range from 80 to 200% by weight based on the amount of the particles.

8. The method for the preparation of vitreous hollow microspheres as claimed in claim 2 in which the concentration of aluminum sulfate in the aqueous solution is in the range from 0.003 to 0.1 mole/liter.

9. The method for the preparation of vitreous hollow microspheres as claimed in claim 3 in which the concentration of urea in the aqueous solution is in the range from 0.5 to 5 moles/liter.

10. The method for the preparation of vitreous hollow microspheres as claimed in claim 1 in which the heat treatment of the aqueous dispersion in step (b) is performed under monitoring of the pH of the aqueous dispersion.

11. The method for the preparation of vitreous hollow microspheres as claimed in claim 10 in which the heat treatment of the aqueous dispersion in step (b) is terminated when the pH of the aqueous dispersion is 6 or higher.

* * * * *